(12) United States Patent
Zhang et al.

(10) Patent No.: US 10,094,987 B2
(45) Date of Patent: Oct. 9, 2018

(54) FIBER OPTIC CONNECTOR HAVING RADIO FREQUENCY IDENTFICIATION TAG AND OPTICAL FIBER CONNECTION DEVICE

(71) Applicant: ADC Telecommunications (Shanghai) Distribution Co., Ltd., Shanghai (CN)

(72) Inventors: Weili Zhang, Shanghai (CN); Zhaoyang Tong, Shanghai (CN)

(73) Assignee: ADC Telecommunications (Shanghai) Distribution Co., Ltd., Shanghai (CN)

( * ) Notice: Subject to any disclaimer, the term of this patent is extended or adjusted under 35 U.S.C. 154(b) by 0 days.

(21) Appl. No.: 15/028,659

(22) PCT Filed: Oct. 10, 2014

(86) PCT No.: PCT/IB2014/065202
§ 371 (c)(1),
(2) Date: Apr. 11, 2016

(87) PCT Pub. No.: WO2015/052685
PCT Pub. Date: Apr. 16, 2015

(65) Prior Publication Data
US 2016/0266330 A1    Sep. 15, 2016

(30) Foreign Application Priority Data
Oct. 12, 2013  (CN) .................. 2013 2 06315082 U

(51) Int. Cl.
*G02B 6/38* (2006.01)
*G06K 19/077* (2006.01)
(52) U.S. Cl.
CPC ......... *G02B 6/3895* (2013.01); *G02B 6/3821* (2013.01); *G02B 6/3825* (2013.01);
(Continued)

(58) Field of Classification Search
CPC .. G02B 6/3825; G02B 6/0172; G02B 6/3879; G02B 6/3887; G02B 6/3893; G02B 6/3897
See application file for complete search history.

(56) References Cited

U.S. PATENT DOCUMENTS

2005/0150962 A1   7/2005  Colombo et al.
2007/0013487 A1   1/2007  Scholtz et al.
(Continued)

FOREIGN PATENT DOCUMENTS

DE    101 48 563     4/2003
EP    1 211 537      6/2002

*Primary Examiner* — Thomas A Hollweg
*Assistant Examiner* — Mary A El Shammaa
(74) *Attorney, Agent, or Firm* — Merchant & Gould P.C.

(57) ABSTRACT

A fiber optic connector having a radio frequency identification tag and an optical fiber connection device are disclosed in the embodiments of the present invention. The fiber optic connector comprises: a housing (1); a tail sleeve (4) partly inserted in the housing from a first end of the housing and configured to fix an end of an optical fiber cable (20); a tag receiving portion (5) which is formed in a sidewall of the housing, on a radial outside of the tail sleeve and in which the radio frequency identification tag (10) is disposed; and an electromagnetism restriction part (15) disposed between the tag receiving portion and the tail sleeve to restrict an electromagnetic influence of the tail sleeve made of a metal material on the radio frequency identification tag. The adverse influence of metal material in the fiber optic connector on the read performance of the radio frequency identification tag may be eliminated by disposing the electromagnetism restriction part between the metal holding tube and the radio frequency identification tag.

19 Claims, 4 Drawing Sheets

(52) U.S. Cl.
CPC ......... *G02B 6/3849* (2013.01); *G02B 6/3874* (2013.01); *G02B 6/3887* (2013.01); *G06K 19/07771* (2013.01)

(56) References Cited

U.S. PATENT DOCUMENTS

2011/0274437 A1 11/2011 Jones et al.
2013/0200165 A1 8/2013 Downie et al.

FIBER OPTIC CONNECTOR HAVING RADIO FREQUENCY IDENTFICIATION TAG AND OPTICAL FIBER CONNECTION DEVICE

CROSS-REFERENCE TO RELATED APPLICATION

This application is a National Stage of PCT/IB2014/065202, filed Oct. 10, 2014, which claims benefit of Chinese Patent Application No. 201320631508.2 filed on Oct. 21, 2013 in the State Intellectual Property Office of China, the disclosures of which are incorporated herein by reference in their entireties. To the extent appropriate, a claim of priority is made to each of the above disclosed applications.

BACKGROUND OF THE INVENTION

1. Field of the Invention

Embodiments of the present invention relates to an fiber optic connector, and more particularly, to an fiber optic connector having a radio frequency identification (RFID) tag and an optical fiber connection device having the fiber optic connector.

2. Description of the Related Art

In an optical fiber communication system, a fiber optic connector and an optical fiber adaptor are used to perform coupling, distributing or transferring among different optical fibers or pigtail fibers, and each of the fibers or pigtail fibers is coupled to the respective fiber optic connector.

In the prior art, during connecting optical fibers in an optical fiber distribution system, the optical fibers are identified depended on serial numbers on tags adhered to the optical fibers or serial numbers printed on the optical fibers. Also, ports of the fiber optic connector to be connected with the optical fibers are identified depended on serial numbers on tags adhered to the ports or serial numbers printed on the ports.

Accordingly, in practice, for finishing a connection operation of optical fibers, an operator has to perform the following steps of: firstly, looking up a table of the fiber optic connectors to be mounted; secondly, visually identifying serial numbers of optical fibers; and finally, looking for the ports of the fiber optic connector corresponding to the optical fibers based on the table and correctly inserting the optical fibers into the respective ports.

During each of the above steps, it needs the operator to carefully identifying the serial numbers of the optical fiber and/or the fiber optic connector, thereby easily causing visual fatigue of the operator. In a situation, the serial numbers may become blurred or damaged due to the severe application condition and may be illegible for the operator. Also, lighting in the operation field may disadvantageously affect the operator to identify and determine the serial numbers. Furthermore, it is difficult for the operator to find a misconnection of the optical fibers in the field, and the operator cannot find the misconnection in time. The above inconvenience will also be encountered in situations such as sequent maintenance of the fiber optic connectors and/or the optical fibers and changes of interconnections by the optical fiber. Therefore, it becomes more and more important to identify, connect, rearrange, inspect and repair an optical fiber network quickly and correctly.

With the RFID technique, a special identification system can be used to identify a particular object and read and write relevant data by radio signals without needing to establish a physical electric or optical contact between the identification system and the particular object. The object is identified by the radio signal in such a way that an electromagnetic field of a radio frequency transmitted by a reader and a RFID tag attached to the object interact with each other so that date are obtained from the RFID tag and are transmitted to an object device through a relevant link. As a result, a physical position of the object is automatically identified and tracked. The RFID tag contains information electronically stored therein, and can be identified at a distance of up to several meters. Unlike a bar code, the RFID tag may be provided on a surface of an object to be tracked and identified, or embedded in the object to be tracked and identified.

In a conventional optical fiber distribution network intelligent management system based on the RFID technique, a RFID tag having a unique identification code (ID) is mounted to each fiber optic connector. A RFID identifier and an electronic lock are further provided in an optical fiber distribution box to cooperate with background management software and a movable termination. When connection of any fiber optic connector needs to be changed, an instruction is sent by the background management software to the movable termination of the operator. The movable termination guides the operator to find a position of the fiber optic connector. The operator completes the operation under the guidance of the RFID identifier and LED lamps, and any misoperation can be found in time. With the technical solution, thousands of various optical fiber cables and pigtails distributed in the field or a distribution box can be found in time if required, and it can be ensured that all operations and changes of the optical fibers are correct.

FIG. 1 is a longitudinal section view of a conventional LC fiber optic connector. As shown in FIG. 1, the fiber optic connector 200 comprises a housing 201 made of plastic material, a tail sleeve 202 mounted in the housing 201 and configured to connect an external optical fiber cable (not shown), a holding tube 203 mounted in the housing 201 and configured to hold an optical fiber of the optical fiber cable, a fiber ferrule 204 extending from the housing 201, and a spring 205 disposed on the holding tube 203. A butt end of the fiber ferrule must be ground. The holding tube 203 may also be used for guiding injected fixation glue during assembling of the fiber optic connector. Generally, for example, an LC fiber optic connector has a narrow internal space so that the spring 205 and the tail sleeve 202 which are made of metal material extend almost throughout the fiber optic connector 200 in a longitudinal direction. When a RFID tag is mounted to the housing, read performance of the RFID tag will be reduced due to the spring 205 and the tail sleeve 202 if the RFID tag is located around the holding tube 203 made of metal. Furthermore, the radio frequency signal is very sensitive to metal. A passive RFID tag cannot normally operate on an object having a metal surface since this will cause an actual readable distance to be far shorter than an expected readable distance. As a result, the reading efficiency is reduced, misreading will probably occur, or even information in the RFID tag cannot be read at all.

SUMMARY OF THE INVENTION

It is an object of the embodiment of the present invention to provide an fiber optic connector having a RFID tag and an optical fiber connection device, which can eliminate the adverse influence of metal material in the fiber optic connector on the read performance of the RFID tag by disposing an electromagnetism restriction part between a metal holding tube and the RFID tag.

In accordance with an embodiment of an aspect of the present invention, there is provided an fiber optic connector having a radio frequency identification tag, comprising: a housing; a tail sleeve partly inserted in the housing from a first end of the housing and configured to fix an end of an optical fiber cable; a tag receiving portion which is formed in a sidewall of the housing, on a radial outside of the tail sleeve, and in which the radio frequency identification tag is disposed; and an electromagnetism restriction part disposed between the tag receiving portion and the tail sleeve to restrict an electromagnetic influence of the tail sleeve made of a metal material on the radio frequency identification tag.

In accordance with an embodiment of the present invention, the electromagnetism restriction part is disposed in the tag receiving portion.

In accordance with another embodiment of the present invention, the electromagnetism restriction part covers at least a portion of an outside of the tail sleeve.

In accordance with a yet another embodiment of the present invention, the electromagnetism restriction part comprises a ferrite sheet.

In accordance with a still another embodiment of the present invention, the tag receiving portion comprises a substantially cubic chamber extending in the sidewall, and the tag receiving portion has at least one opening in communication with an outside of the fiber optic connector so as to place the radio frequency identification tag into the tag receiving portion through the opening.

In accordance with a further embodiment of the present invention, an elastic tongue portion is formed on a sidewall of the tag receiving portion adjacent to an outside of the fiber optic connector, at one of the at least one opening, and a block protrusion is formed on the tongue portion.

In accordance with a still further embodiment of the present invention, a dust cover is detachably mounted on the opening to seal the opening.

In accordance with a yet further embodiment of the present invention, a sealing material is filled in the tag receiving portion to protect the radio frequency identification tag.

In accordance with another embodiment of the present invention, the fiber optic connector further comprises:

a fiber ferrule extending from a second end of the housing opposite to the first end;

a protection sleeve which is mounted in the tail sleeve and in which an optical fiber of the optical fiber cable is held;

a fixation tube having a first end connected to the fiber ferrule and a second end connected to the protection sleeve; and an spring member having two ends abutting against the fixation tube and an inner wall of the housing between the fixation tube and the inner wall of the housing, respectively.

In accordance with a still another embodiment of the present invention, the fiber optic connector further comprises a stress relief boot fitted over the tail sleeve, wherein the optical fiber cable passes through the stress relief boot and is fixed to the tail sleeve.

In accordance with a further embodiment of the present invention, the housing comprises a first housing for connecting to the optical fiber cable and a second housing for mounting the fiber ferrule, wherein the first housing and the second housing are detachably assembled together in a snap manner, and the tag receiving portion is formed in the first housing.

In accordance with an embodiment of another aspect of the present invention, there is provided an optical fiber connection device, comprising:

the fiber optic connector according to any of the above-mentioned embodiments;

an adaptor in which the fiber optic connector is inserted to be coupled to a mating connector inserted in the adaptor;

a support frame to which the adaptor is mounted; and a radio frequency read-write antenna mounted to the support frame.

The fiber optic connector having a radio frequency identification tag according to the above embodiments of the present invention may eliminate the adverse influence of metal material in the fiber optic connector on the read performance of the radio frequency identification tag by disposing the electromagnetism restriction part between the metal holding tube and the radio frequency identification tag. In addition, it is substantially unnecessary to change a size of the fiber optic connector and thus the fiber optic connector may be fitted with a standard connector adaptor for receiving a fiber optic connector.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Figure 1:
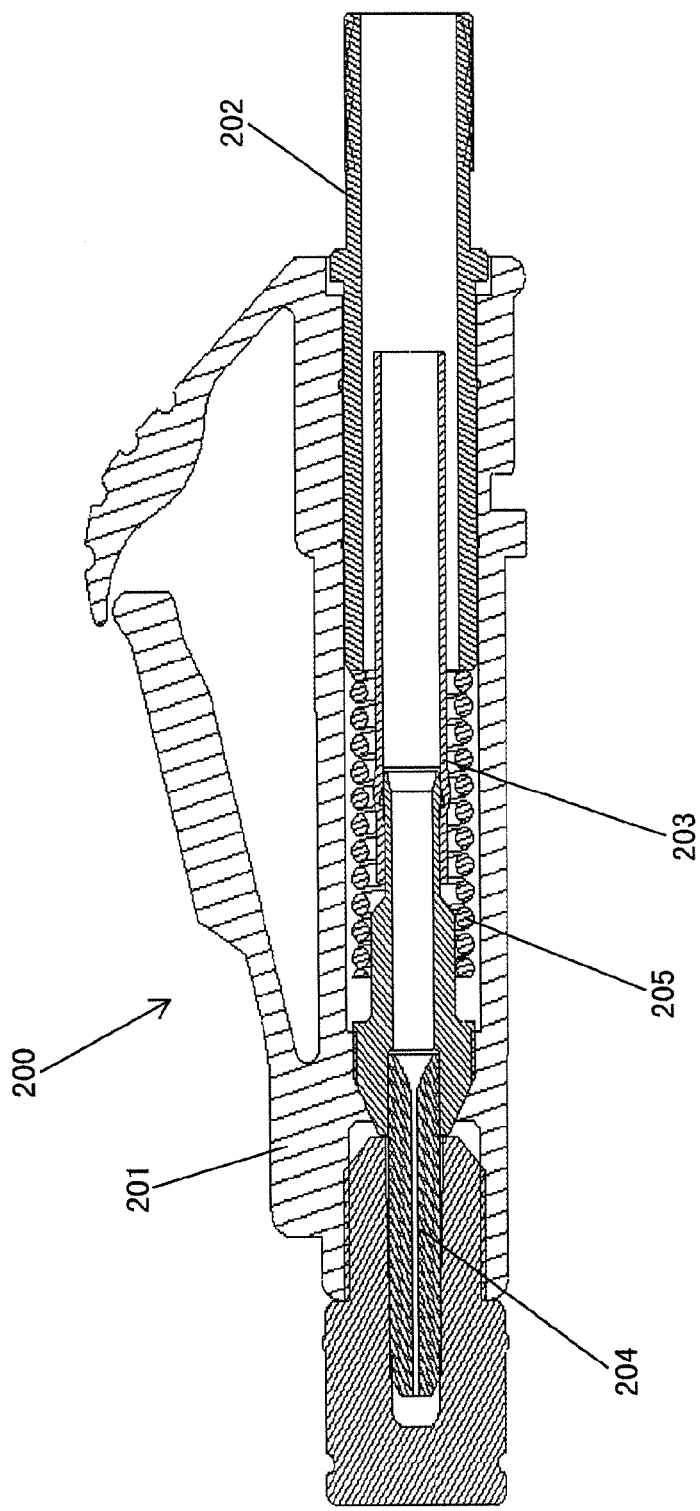
FIG. 1 is a longitudinal section view of a conventional fiber optic connector.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
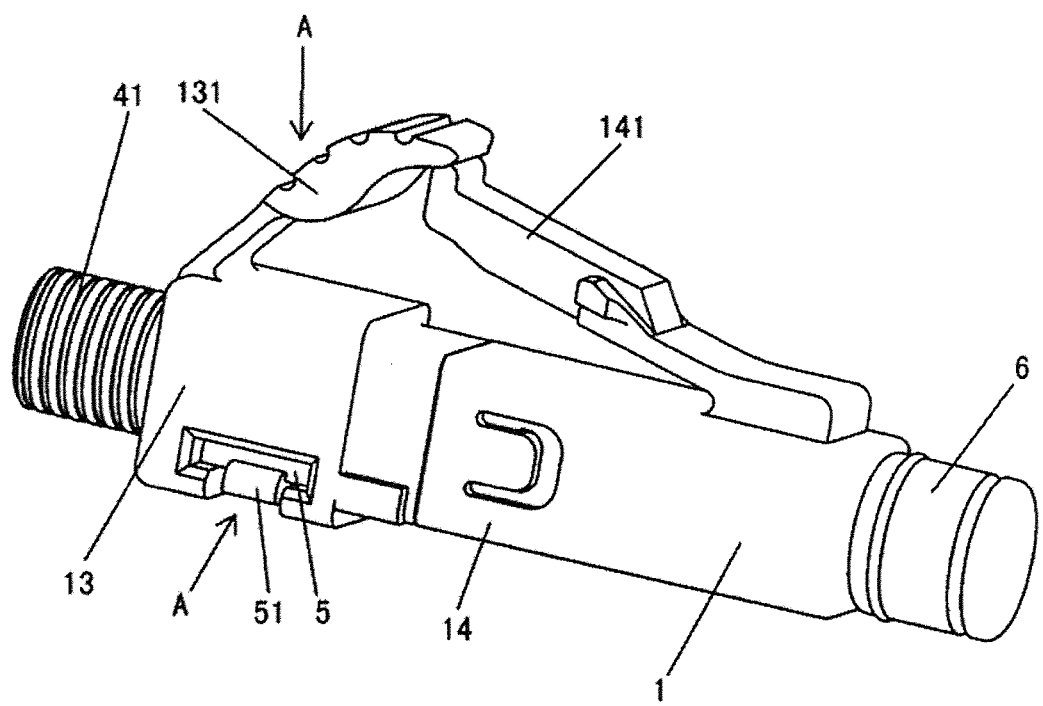
FIG. 2 is a schematic perspective view of a fiber optic connector according to a first embodiment of the present invention.
Figure 3:
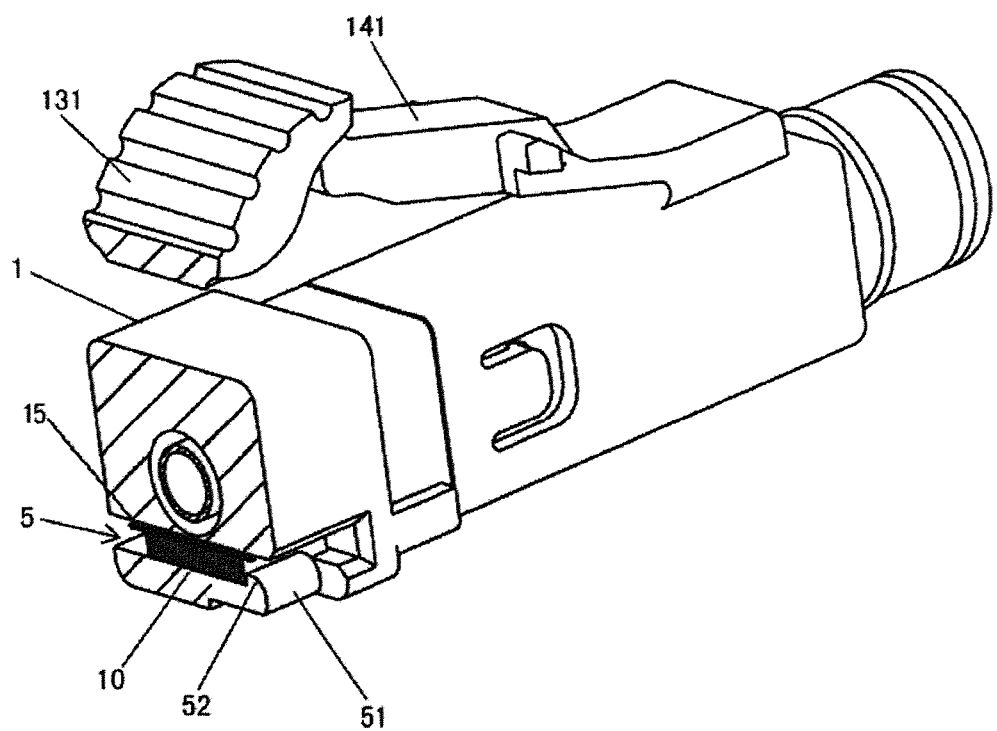
FIG. 3 is a schematic perspective section view of the fiber optic connector taken along the line A-A in FIG. 2.
Figure 4:
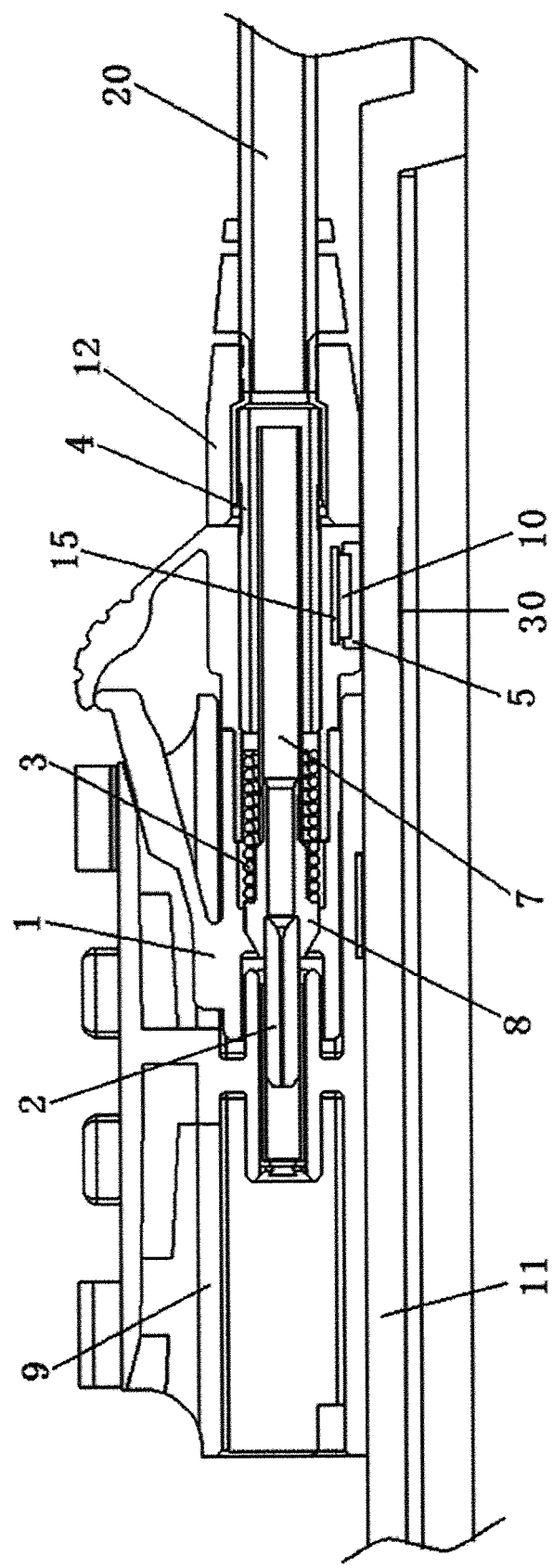
FIG. 4 is a longitudinal section view of the fiber optic connector shown in FIG. 2 in a state where it is inserted in an adaptor.

FIGS. 2-3 show a fiber optic connector, such as an LC fiber optic connector, according to an embodiment of the present invention. FIG. 4 is a longitudinal section view of the fiber optic connector shown in FIG. 2 in a state where it is inserted in an adaptor. The fiber optic connector has a radio frequency identification tag 10 and is used for connecting an optical fiber of an optical fiber cable (not shown).

The fiber optic connector is configured to be detachably inserted into the adapter 9 to be coupled with a mating fiber optic connector (not shown) also inserted in the adapter 9, so that the optical fiber of the optical fiber cable connected to the fiber optic connector is optically coupled with a fiber connected to the mating fiber optic connector. In order to quickly and correctly couple the fiber optic connector 100 to the mating fiber optic connector, the fiber optic connector comprises the radio frequency identification tag, and a housing 1 made of an insulation material such as plastic, a tail sleeve 4, a tag receiving portion 5, and an electromagnetism restriction part 15 and 16. The tail sleeve 4 is partly inserted in the housing from a first end of the housing 1 (the right end in FIG. 4) and is configured to fix an end of an optical fiber cable 20. The tag receiving portion 5 is formed in a sidewall of the housing 1, on a radial outside of the tail sleeve 4, and the radio frequency identification tag 10 is disposed in the tag receiving portion 5. The electromagnetism restriction part 15 and 16 is disposed between the tag receiving portion 5 and the tail sleeve 4 to restrict an electromagnetic influence of the tail sleeve 4 made of a metal material on the radio frequency identification tag 10.

In some embodiments, the electromagnetism restriction part 15 is disposed in the tag receiving portion 5. For example, the electromagnetism restriction part 15 is adhesively fixed in the tag receiving portion 5, and the radio frequency identification tag 10 is placed on the electromagnetism restriction part 15. In an exemplary embodiment, the electromagnetism restriction part 15 comprises a ferrite sheet. However, the electromagnetism restriction part 15 may also comprise another sheet made of a material that can restrict an influence of a metal on a magnetic field, or another sheet made of a material that can improve an intensity of a magnetic field passing through the radio frequency identification tag or a read antenna. A size of the electromagnetism restriction part 15 is at least larger than that of the radio frequency identification tag 10 so as to improve electromagnetic restriction on the tail sleeve.

In an exemplary embodiment, the housing 1 comprises a first housing 13 for connecting to the optical fiber cable and a second housing 14 for mounting a fiber ferrule 2. The first housing 13 and the second housing 14 may be detachably assembled together in a snap manner, and the tag receiving portion 5 may be formed in the first housing 13. A locking mechanism 141 for locking the fiber optic connector in the adapter (not shown) is provided on the second housing 14, and a release mechanism 131 for unlocking the locking mechanism 141 is provided on the first housing 13. The locking mechanism 141 may be moved toward the housing 1 in a radial direction of the fiber optic connector by pressing the release mechanism 131.

The fiber optic connector according to a further embodiment further comprises: the fiber ferrule 2 extending from a second end of the housing 1 opposite to the first end; a protection sleeve 7 which is mounted in the tail sleeve 4 and in which an optical fiber of the optical fiber cable 20 is held; a fixation tube 8 having a first end connected to the fiber ferrule 2 and a second end connected to the protection sleeve 7; and an spring member 3 having two ends abutting against the fixation tube 8 and an inner wall of the housing 1 between the fixation tube 8 and the inner wall of the housing 1, respectively.

The metal part in the fiber optic connector which has the influence on the radio frequency identification tag 10 may be the metal tail sleeve 4, the spring member such as a metal spring, a metal locking ring for fixing a Kevlar (protection layer) of the optical fiber cable, or any other metal part for any other purpose.

In an exemplary embodiment of the present invention, the tag receiving portion 5 has a substantially cubic chamber extending in the sidewall of the first housing 13 at a bottom of the first housing 13. The tag receiving portion 5 has at least one opening in communication with an outside of the fiber optic connector so as to place the radio frequency identification tag 10 into the tag receiving portion 5 through one of the at least one opening. In an exemplary embodiment, the tag receiving portion 5 is formed with two openings at both sides of the fiber optic connector in a lateral direction of the fiber optic connector. In another exemplary embodiment, the tag receiving portion 5 is formed with only one opening at one side of the fiber optic connector in the lateral direction and is closed at the other side of the fiber optic connector in the lateral direction. In this way, the radio frequency identification tag 10 can be easily and reliably held in the tag receiving portion 5. Furthermore, as shown in FIGS. 2-3, an elastic tongue portion 51 is formed on a sidewall (for example, the bottom wall in FIG. 3) of the tag receiving portion 5 adjacent to an outside of the fiber optic connector, at one of the at least one opening, and a block protrusion 52 is formed on the tongue portion 51. The block protrusion 52 has an arc or angled surface on an outside. When the radio frequency identification tag 10 is inserted into the tag receiving portion 5, the radio frequency identification tag 10 biases the tongue portion 51 outwards by pressing the arc or angled surface of the block protrusion 52. On the other hand, when the radio frequency identification tag 10 needs to be taken out of the tag receiving portion 5, an operator may press the tongue portion 51 downwards to bias the tongue portion 51 outwards with a hand or a tool, such as a screw driver, until the block protrusion 52 does not block the radio frequency identification tag 10 anymore. Thereby, the radio frequency identification tag 10 may be taken out of the tag receiving portion 5. In this way, by operating the tongue portion 51, the radio frequency identification tag 10 may be easily placed in or taken out of the tag receiving portion 5, facilitating replacement and maintenance of the radio frequency identification tag 10. Moreover, a sealing material may be coated in the opening and/or filled in the tag receiving portion 5, or a dust cover may be detachably mounted on the opening to seal the opening, thereby protecting the RFID tag 10 and ensuring that the RFID tag 10 is protected from an external environment.

In an exemplary embodiment, as shown in FIG. 2, a dust cap 6 is mounted on the second end of the housing 1 to seal the housing 1 and protect the fiber ferrule 2. The optical fiber of the optical fiber cable 20 passes through the protection sleeve 7 and is held in the protection sleeve 7. The spring member 3, such as a spring, is disposed around the protection sleeve 7. The fixation tube 8 has the first end connected to the fiber ferrule 2 and the second end connected to the protection sleeve. The fiber ferrule 2 is fixed on the end (the left end in FIG. 4) of the fixation tube 8, and the fiber passes through the protection sleeve 7 and the fixation tube 8 and is connected to the fiber ferrule 2. Both ends of the spring member 3 abut against the fixation tube 8 and a ring step formed within the inside of the first housing 13, respectively. When the fiber optic connector 100 is inserted into the adapter and coupled with the mating fiber optic connector mounted in the adapter 9, the fiber ferrule 2 is pressed by the mating fiber optic connector, and in turn compresses the spring member 3 via the fixation tube 8, so that the fiber ferrule of the fiber optic connector 100 and that of the mating fiber optic connector are tightly abutted against and coupled with each other.

In an exemplary embodiment of the present invention, the fiber optic connector 100 further comprise a stress relief boot 12 fitted over the tail sleeve 4. The optical fiber cable passes through the stress relief boot 12 and is fixed to a protrusion portion 41 of the tail sleeve 4 protruding from the housing 1. Specifically, after the optical fiber cable passes through the stress relief boot 12 and the tail sleeve 4, an outmost protection sleeve of the optical fiber cable (a single-fiber cable) is peeled off to expose an inside tube and a Kevlar layer such as, an reinforcing acrylics layer, and the inside tube is peeled off to expose the optical fiber. The optical fiber passes through the protection sleeve 7 and the fixation tube 8 and reaches the fiber ferrule. After that, the reinforcing acrylics layer is uniformly arranged on the protrusion portion 41, and a metal crimping sleeve is crimped on the protrusion portion 41 and the protection sleeve of the optical fiber cable. Thereby, the optical fiber cable or the optical fiber is connected to the fiber optic connector 100.

In an exemplary embodiment, as shown in FIG. 4, the housing 1, the fiber ferrule 2, the fixation tube 8, the protection sleeve 7, the crimping sleeve and the tail sleeve 4 have a common center axis.

Figure 5:
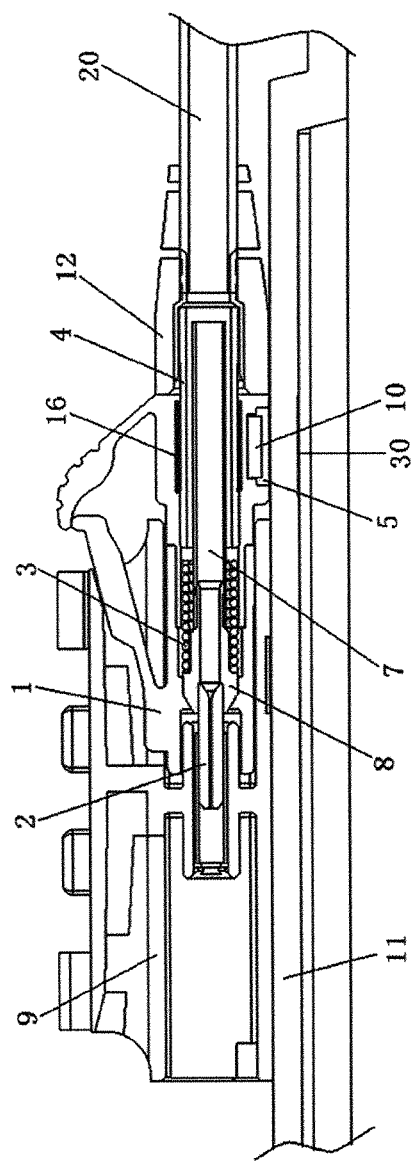
FIG. 5 is a longitudinal section view of a fiber optic connector in a state where it is inserted in an adaptor, according to a second embodiment of the present invention.

FIG. 5 is a longitudinal section view of a fiber optic connector in a state where it is inserted in an adaptor, according to a second embodiment of the present invention. The fiber optic connector according to the second embodiment differs from the fiber optic connector according to the first embodiment in that the electromagnetism restriction part 16 covers (for example, adheres to) at least a portion of an outside of the tail sleeve 4 and is located on an outer wall of the tail sleeve 4 facing the radio frequency identification tag. In this way, the influence of the tail sleeve 4 made of the metal material in the fiber optic connector on the read performance of the radio frequency identification tag 10 may also be eliminated. The other components of the fiber optic connector according to the second embodiment which are the same as or correspond to those of the fiber optic connector according to the first embodiment are still denoted by the same reference numerals and are no longer described in detail for the sake of brevity.

In accordance with an embodiment of another aspect of the present invention, as shown in FIGS. 4 and 5, there is provided an optical fiber connection device, comprising: the fiber optic connector according to any of the above-mentioned embodiments; an adaptor 9 in which the fiber optic connector is inserted to be coupled to a mating connector (not shown) inserted in the adaptor 9, so that an optical fiber of an optical fiber cable 20 connected to the fiber optic connector is optically coupled with a fiber of an optical fiber cable connected to a mating fiber optic connector; a support frame 11 to which the adaptor 9 is mounted; and a radio frequency read-write antenna 30 mounted to the support frame 11. The radio frequency read-write antenna 30 is located under the fiber optic connector opposite the radio frequency identification tag 10.

Alternatively, the electromagnetism restriction part may be disposed in any position between the RFID tag 10 and the tail sleeve 4 made of the metal material. For example, the electromagnetism restriction part may be clamped within the housing 1.

In the fiber optic connector and the optical fiber connection device according to the above embodiments, the magnetic force restriction part is disposed between the RFID tag 10 and the metal tail sleeve 4. The magnetic force restriction part can greatly shield against a magnetic field of the metal tail sleeve 4, reduce the electromagnetic influence of the tail sleeve 4 on the radio frequency identification tag 10, and effectively improve the readable distance of the radio frequency identification tag, so that information of the radio frequency identification tag 10 may be effectively and reliably read by the radio frequency read-write antenna 30.

Although the fiber optic connector according to the embodiment of the present invention has been described by taking example for the LC fiber optic connector, it may also comprise other types of fiber optic connectors. In addition, the electromagnetism restriction part according to the embodiments of the present invention is particularly suitable for a situation in which there is a metal material that affects a product to be identified if a wiring density is high or a space is narrow, in addition to its application to the fiber optic connector according to the embodiment of the present invention.

It is substantially unnecessary to change a thickness dimension of the fiber optic connector according to the embodiments of the present invention with respect to an fiber optic connector in which a distance between a metal member and a radio frequency identification tag is increased to reduce the influence of the metal member on read of the radio frequency identification tag. In addition, with the fiber optic connector according to the embodiments of the present invention, the influence of the metal material on the read and write performance of the RFID tag is eliminated, mechanical property test requirements for axial and lateral tensile strengths of a small fiber optic connector can be satisfied, and miniaturization of an external dimension of the entire fiber optic connector is maintained, thereby facilitating high-density arrangement of the fiber optic connectors.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention claimed is:

1. A fiber optic connector having a radio frequency identification tag, comprising:
 a housing;
 a tail sleeve partly inserted in the housing from a first end of the housing and configured to fix an end of an optical fiber cable;

a tag receiving portion which is formed in a sidewall of
the housing, on a radial outside of the tail sleeve, and
in which the radio frequency identification tag is disposed; and an electromagnetism restriction part disposed between the tag receiving portion and the tail sleeve to restrict an electromagnetic influence of the tail sleeve made of a metal material on the radio frequency identification tag, wherein the tag receiving portion comprises a substantially cubic chamber extending in the sidewall, and the tag receiving portion has at least one opening in communication with an outside of the fiber optic connector so as to place the radio frequency identification tag into the tag receiving portion through the opening, and wherein an elastic tongue portion is formed on a sidewall of the tag receiving portion adjacent to the outside of the fiber optic connector, at one of the at least one opening, and a block protrusion is formed on the tongue portion.

2. The fiber optic connector of claim 1, wherein the electromagnetism restriction part is disposed in the tag receiving portion.

3. The fiber optic connector of claim 1, wherein the electromagnetism restriction part covers at least a portion of an outside of the tail sleeve.

4. The fiber optic connector of claim 1, wherein the electromagnetism restriction part comprises a ferrite sheet.

5. The fiber optic connector of claim 1, wherein a dust cover is detachably mounted on the opening to seal the opening.

6. The fiber optic connector of claim 1, wherein a sealing material is filled in the tag receiving portion to protect the radio frequency identification tag.

7. The fiber optic connector of claim 1, further comprising:
a fiber ferrule extending from a second end of the housing opposite to the first end;
a protection sleeve which is mounted in the tail sleeve and in which an optical fiber of the optical fiber cable is held;
a fixation tube having a first end connected to the fiber ferrule and a second end connected to the protection sleeve; and
a spring member having two ends abutting against the fixation tube and an inner wall of the housing between the fixation tube and the inner wall of the housing, respectively.

8. The fiber optic connector of claim 7, further comprising a stress relief boot fitted over the tail sleeve, wherein the optical fiber cable passes through the stress relief boot and is fixed to the tail sleeve.

9. The fiber optic connector of claim 7, wherein the housing comprises a first housing for connecting to the optical fiber cable and a second housing for mounting the fiber ferrule, wherein the first housing and the second housing are detachably assembled together in a snap manner, and the tag receiving portion is formed in the first housing.

10. An optical fiber connection device, comprising:
the fiber optic connector according to claim 1;
an adaptor in which the fiber optic connector is inserted to be coupled to a mating connector inserted in the adaptor;
a support frame to which the adaptor is mounted; and
a radio frequency read-write antenna mounted to the support frame.

11. A fiber optic connector having a radio frequency identification tag, comprising:
a housing;
a tail sleeve partly inserted in the housing from a first end of the housing and configured to fix an end of an optical fiber cable;
a tag receiving portion which is formed in a sidewall of the housing, on a radial outside of the tail sleeve, and in which the radio frequency identification tag is disposed; and
an electromagnetism restriction part disposed between the tag receiving portion and the tail sleeve to restrict an electromagnetic influence of the tail sleeve made of a metal material on the radio frequency identification tag,
wherein the tag receiving portion comprises a chamber having at least one opening in communication with an outside of the fiber optic connector so as to place the radio frequency identification tag into the chamber of the tag receiving portion through the at least one opening, and
wherein an elastic tongue portion is formed on a sidewall of the tag receiving portion at one of the at least one opening, and a block protrusion is formed on the elastic tongue portion.

12. The fiber optic connector of claim 11, wherein the electromagnetism restriction part is disposed in the tag receiving portion.

13. The fiber optic connector of claim 11, wherein the electromagnetism restriction part covers at least a portion of an outside of the tail sleeve.

14. The fiber optic connector of claim 11, wherein the electromagnetism restriction part comprises a ferrite sheet.

15. The fiber optic connector of claim 11, wherein a dust cover is detachably mounted on the opening to seal the opening.

16. The fiber optic connector of claim 11, wherein a sealing material is filled in the tag receiving portion to protect the radio frequency identification tag.

17. The fiber optic connector of claim 11, further comprising:
a fiber ferrule extending from a second end of the housing opposite to the first end;
a protection sleeve which is mounted in the tail sleeve and in which an optical fiber of the optical fiber cable is held;
a fixation tube having a first end connected to the fiber ferrule and a second end connected to the protection sleeve; and
a spring member having two ends abutting against the fixation tube and an inner wall of the housing between the fixation tube and the inner wall of the housing, respectively.

18. The fiber optic connector of claim 17, further comprising a stress relief boot fitted over the tail sleeve, wherein the optical fiber cable passes through the stress relief boot and is fixed to the tail sleeve.

19. The fiber optic connector of claim 17, wherein the housing comprises a first housing for connecting to the optical fiber cable and a second housing for mounting the fiber ferrule, wherein the first housing and the second housing are detachably assembled together in a snap manner, and the tag receiving portion is formed in the first housing.

* * * * *